United States Patent [19]

Weiger et al.

[11] Patent Number: 4,531,706

[45] Date of Patent: Jul. 30, 1985

[54] PRESSURE OPERATED CONTROL INSTALLATION

[75] Inventors: Günter Weiger, Esslingen; Paul Schwerdt, Freudenstadt; Horst Grossner, Berglen, all of Fed. Rep. of Germany

[73] Assignee: Daimler-Benz Aktiengesellschaft, Fed. Rep. of Germany

[21] Appl. No.: 500,813

[22] Filed: Jun. 3, 1983

Related U.S. Application Data

[62] Division of Ser. No. 193,443, Oct. 3, 1980, abandoned.

[30] Foreign Application Priority Data

Oct. 3, 1979 [DE] Fed. Rep. of Germany ....... 2940112

[51] Int. Cl.[3] ............................................ F16K 31/02

[52] U.S. Cl. ...................................... 251/25; 91/361; 91/398; 123/571; 251/30; 60/404

[58] Field of Search ................ 91/361, 398, 404, 410; 123/568, 569, 571; 60/404; 251/25, 29, 30

[56] References Cited

U.S. PATENT DOCUMENTS

| | | | |
|---|---|---|---|
| 3,926,159 | 12/1975 | Michelson | 123/90.11 |
| 3,980,002 | 9/1976 | Jarman et al. | 251/30 |
| 4,265,163 | 5/1981 | Arao et al. | 91/361 |

FOREIGN PATENT DOCUMENTS 2059174 5/1971 France .

*Primary Examiner*—George L. Walton
*Attorney, Agent, or Firm*—Craig and Burns

[57] ABSTRACT

A pressure operated control installation, especially for automotive vehicles, which includes a pressure source and a servo member controlled through a control block. The control block includes a logistor, a control element coupled with a control unit, and a bypass line with a throttling arrangement. The pressure conducting inlet of the logistor is connected through the bypass line to a control inlet of the logistor and the control unit controls a connection between the control inlet of the logistor and a return line. At least two control blocks are provided with a control outlet of the logistor of the first control block and a pressure conducting inlet of the logistor of the second control block being connected to the servo member.

6 Claims, 7 Drawing Figures

PRESSURE OPERATED CONTROL INSTALLATION

This is a division of application Ser. No. 193,443, filed Oct. 3, 1980 now abandoned.

The present invention relates to a control installation and, more particularly, to a pressure operated control installation, especially for a motor vehicle, which includes a pressure source and a servo member controlled through a control block, wherein the control block includes a logistor, a control element coupled with a control unit, and a bypass line with throttling means, and wherein a pressure conducting inlet of the logistor is connected, through a bypass line, to the logistor control inlet, with the control unit controlling a connection between the control inlet of the logistor and a return line.

Control installations with a pressure source and a servo member are generally known. Moreover, control modules have been proposed which include a logistor and a control element coupled with a control unit.

The aim underlying the present invention essentially resides in providing a pressure operated digitally pulsed control installation which minimizes the amount of electrical energy necessary to operate the control member.

In accordance with advantageous features of the present invention, at least two control blocks are provided with a controlled outlet of the logistor of the first control block and a pressure conducting inlet of the logistor of the second control block being connected to the servo member.

Additionally, in accordance with further features of the present invention, the controlled logistor outlet of the first control block and the pressure conducting logistor inlet of the second control block are connected to a chamber which contains an adjustable working piston which is associated with the servo member.

Advantageously, each control unit is connected to a controller and the servo member exhibits a signal generator for a measuring variable, which signal generator is connected to the controller.

Advantageously, in accordance with the present invention, the servo member is a hydraulic operating cylinder having a working piston which is mechanically connected to a valve member of a valve construction.

Preferrably, a signal amplifier is provided between the signal generator and the controller and, advantageously, the controller is constituted by an electronic control circuit.

In accordance with still further features of the present invention, the pressure conducting logistor outlet of the second control block is connected to the return line, with the control logistor outlet of the first control block and pressure conducting logistor inlet of the second control block being connected with each other.

In accordance with the present invention, the pressure conducting chamber of the servo member is connected to a relief pressure valve, with an outlet of the relief pressure valve being connected to a pressureless reservoir.

In accordance with yet further features of the present invention, the controlled outlet of the logistor of the second control block is connected to the return line as well as, through a bypass line with a throttling means, to the control inlet of this logistor in a feedback coupling. The controlled outlet is in communication, on the one hand, through a check valve, with the pressure-conducting inlet of the logistor and, on the other hand, with a controlled outlet of the logistor of the first control block.

Advantageously, the return line is connected to a tank or reservoir and the pressure conducting logistor inlet of the first control block is connected to a pressure line carrying the fluid under pressure, wherein the pressure line is in communication with a pressure source by way of a hydraulic reservoir.

The servo motor, in accordance with the present invention, includes two chambers which are separated by a working piston. One of the two chambers is connected to the inlet of the logistor of the first control block and the other chamber is connected to the controlled outlet of the logistor of the first control block as well as to the inlet of the logistor of the second control block.

Advantageously, the control unit of the first control block, in an inactive or inoperative condition, is bypassed into a closed position, with the control unit of the second control block, in the inactive or inoperative condition, being biased into an open position.

Advantageously, the control unit may be constructed as a pilot valve. Additionally, the control unit may take the form of a magnetically or piezoelectrically actuatable switching member.

In accordance with the present invention, a device may be provided for biasing the control unit into an inactivated condition in a preferential position. Moreover, the two control blocks, the servo member, and the control units may form an integrated module.

By virtue of the provision of a control installation in accordance with the present invention, it is possible to derive energy for the adjustment of a control member from the energy sources present, for example, from an engine oiled circulatory system or oil pressure of the circulatory system, the fuel conveying or supplying circulatory system or cycle, a central hydraulic system, or the like. The derivation of energy from such energy sources is attainable in motor vehicles by corresponding connections to the engine oil circulatory system of the like.

With a control installation such as proposed by the present invention, it is necessary to provide hydraulic amplifying members operating without hysteresis and exhibiting brief switching periods. A hydraulic amplifying member having these basic properties has been proposed and is commonly called a logistor. A logistor may operate satisfactorily only if an associated control unit can transmit control commands corresponding to the brief rise and fall times.

The control installation proposed by the present invention may be advantageously utilized for exhaust gas control in diesel engines and, especially, for specific rotational speeds or speed ranges in diesel engines. Additionally, it is also possible to use the control installation of the present invention, for example, in conjunction with hydrogen-injection valves in internal combustion engines, in hydraulic valve shut-off units, in automatic transmissions, control operated test stand systems, as distance setting means, etc.

Additionally, the control installation of the present invention may be advantageously employed in automobiles as a self-resetting controller adjusting system without closed-circuit consumption, whereby the difficulties of conventional, self-resetting adjusting systems may be avoided wherein the adjustment of equilibrium is obtained by a spring executing the resetting step and an analog magnet and/or a servo motor. While an energy consumption to maintain the equilibrium is unavoidable in conventional adjusting systems, the energy customarily being derived from the electrical wiring system of the automobile, resetting in the installation of the present invention takes place without the supply or feeding of electrical energy and, for example, the required energy may be derived from existing systems such as, for example, the lubricating oil circulatory system of the engine of the motor vehicle.

Accordingly, it is an object of the present invention to provide a control installation which avoids, by simple means, shortcomings and disadvantages encountered in the prior art.

Another object of the present invention resides in providing a pressure operated control installation for motor vehicles, wherein the energy for enabling an adjustment of a control member by the control installation is derived from an energy source of the motor vehicle.

Yet another object of the present invention resides in providing a control installation which operates without hysteresis and exhibits brief switching periods.

A still further object of the present invention resides in providing a pressure operated control installation which is of simple and compact construction and which is relatively inexpensive to manufacture.

Another object of the present invention resides in providing a pressure operated control installation which functions realiably under all operating conditions.

These and other objects, features, and advantages of the present invention will become more apparent from the following description when taken in connection with the accompanying drawings which show, for the purposes of illustration only, several embodiments in accordance with the present invention, and wherein.

Figure 1:
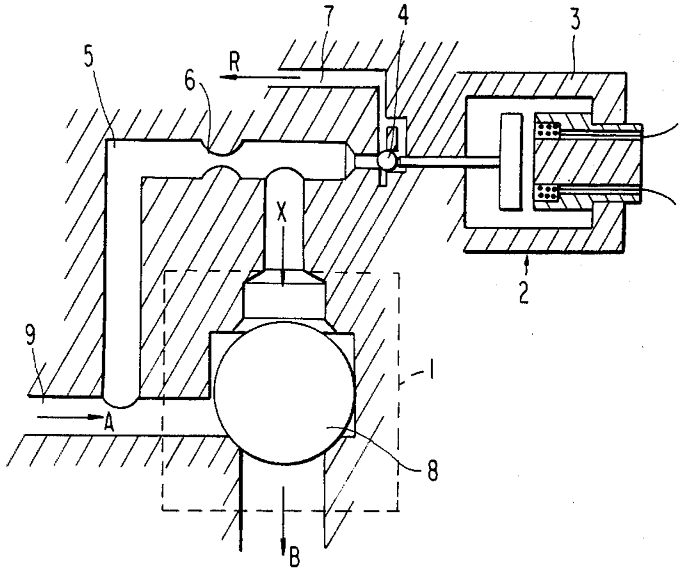
FIG. 1 is a partially schematic cross sectional view of a control block with a logistor and associated control unit in accordance with the present invention.

Referring now to the drawings wherein like reference numerals are used throughout the various views to designate like parts and, more particularly to FIG. 1, according to this Figure, a logistor 1, of a conventional construction, is associated with a control unit generally designated by the reference numeral 2, with the control unit 2 consisting of a control mechanism 3 and a control element 4. The logistor 1 includes a control inlet or input X, a pressure-carrying inlet A, and a controlled outlet or output B, with the control outlet B normally extending to a servo or adjusting member which will be described more fully hereinbelow. Control volumes between the control inlet X and controlled outlet B customarily have a ratio of 1:10 and above.

The inlet A and the control inlet X are connected with each other by a bypass line 5. the bypass line 5 includes a throttling point or throttling section 6. The control inlet X of the logistor 1 is connected to a return or backflow line 7, and the control element 4 is arranged between the control inlet X and the return line 7. The control element 4 may, for example, take the form of a sphere or ball element which is adapted to be pressed into a seat by the control mechanism 3 in such a manner that the connection between the control inlet X and return line 7 is selectively blocked.

Briefly, the logistor 1 operates in the following manner:

In the position illustrated in FIG. 1, the connection between the return line 7 and the control inlet X is blocked by the spherical control element 4. A pressure, produced by an external pressure source, is applied to the inlet A of the logistor 1. At the same time, a pressure is built up at the control inlet X through the bypass line 5 and the throttle device 6. Consequently, a ball or sphere 8 closes off the controlled outlet B. The ball or sphere 8 for closing the controlled outlet B is held in the position shown in FIG. 1 by the pressure applied to the control inlet X.

Upon opening the connection between the control inlet X and the return line 7, which occurs when the spherical or ball shaped control element is released by the control mechanism 3, the pressure fed to a feed line 9 is partially discharged through the return line 7. Due to provision of the throttling point and the open connection between the return line 7, a lower pressure exists at the control inlet X than at the inlet A so that the control element or ball 8 in FIG. 1 is displaced upwardly and thus a control output signal is produced at the control outlet B.

The desired fall and rise times, that is, the brief switching times of the logistor 1 is ensured by virtue of the cooperation of the bypass line 5 with the control mechanism 3. The control mechanism 3 may, for example, be an electromagnetic switching element, an eddy current switching element, or a piezoelectric switching element. The control mechanism 3 may be connected to a controller which applies a control signal to the controller mechanism to act on the control element 4 in a manner described more fully hereinbelow. Moreover, a preferred embodiment of the control mechanism 3 will be described in detail hereinbelow in connection with FIGS. 5 and 6.

Figure 2:
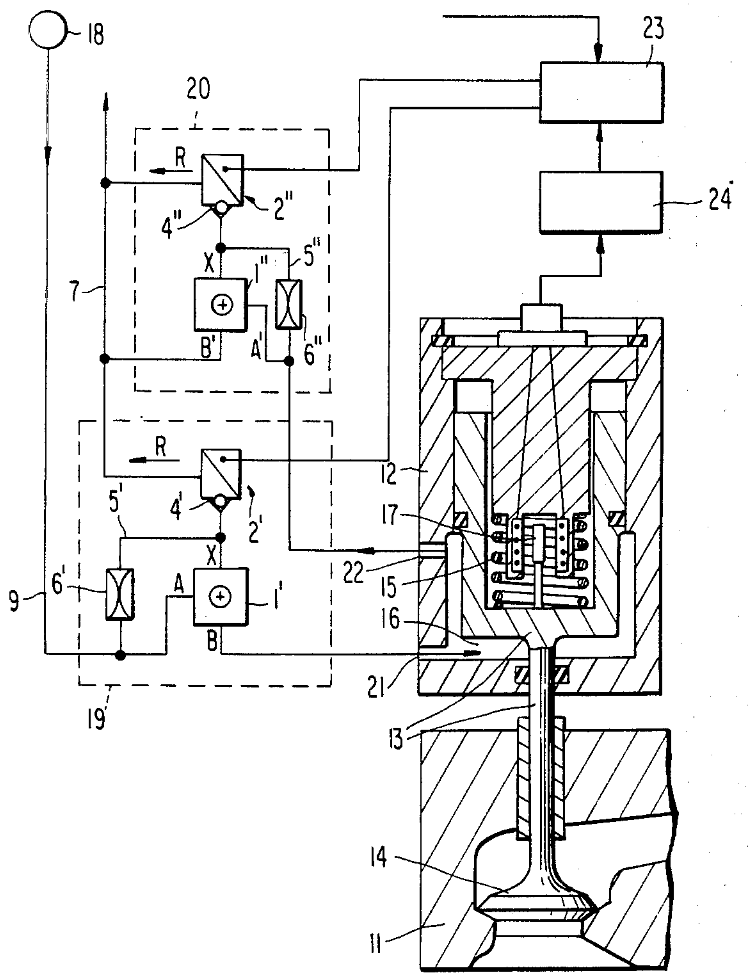
FIG. 2 is a partially schematic cross sectional view of a control installation for regulation of exhaust gases of an engine of a motor vehicle utilizing two control blocks of the type illustrated in FIG. 1.

The basic arrangement illustrated in FIG. 1 may be utilized in a control system such as shown in FIG. 2. More particularly, according to FIG. 2, a control system for an exhaust gas regulating valve 11 includes a hydraulic operating cylinder 12, of a conventional construction, with a working piston 13 coupled with a valve member 14 of the exhaust gas regulating valve 11. By moving or displacing the working piston 13, the position of the valve member 14 of the exhaust gas regulating valve 11 may be varied. A spring 15 is provided for biasing the working piston 13 and a chamber 16 for accommodating a pressure medium is defined between the cylinder 12 and working piston 13, which piston 13 is displaceably mounted in the cylinder 12, so that by varying the pressure in the chamber 16 the working piston 13 is shifted. The operating cylinder 12 contains a measuring signal generator 17, of a conventional construction, which yields a signal corresponding to a position of the working piston 13 which signal represents a measuring variable.

The control system in FIG. 2 in conjunction with the operating cylinder 12 will be described in greater detail hereinbelow. More particularly, the control system, as noted above preferably serves for the regulation of exhaust gases in an internal combustion engine. Engine oil under pressure is fed from a pressure source 18 to the control system through a conduit or line 9. The pressure of the engine oil is equal to or higher than 1 bar. The conduit 9 may also be selectively fed or acted upon by fuel conveying pressure of a fuel conveying system of the engine.

The control system of FIG. 2 includes two control blocks 19, 20. The control block 19 includes a logistor 1′, a bypass line 5′, and a control block generally designated by the reference numeral 2′. The control unit 20 includes a logistor 1″, a bypass line 5″, and a control unit generally designated by the reference numeral 2″. The conduit 9 extends from the pressure source 18 to the inlet A of the logistor 1′ of the first unit 19 whereby, in dependence upon a control by the control unit 2′, a pressure present in the conduit 9 may be applied through the control outlet B of the logistor 1′ of the control block 19 by way of an inlet 21 to the cylinder chamber 16. An outlet 22 of the operating cylinder 12 is in communication with an inlet A′ of the logistor 1″ of the second control block 20, with the outlet B′ of the logistor 1″ of the second control block 20 being connected to the return line 7 which may be connected to, for example, an engine oil backflow or return line.

A controller 23, of conventional construction, serves for controlling the operation of the control units 2′ and 2″. The controller 23 may, for example, be an electronic circuit adapted to receive a governing variable from a pickup or sensor (not shown) on the one hand, and a measuring variable from the measuring signal generator 17, on the other hand, by way of, for example, an amplifier 24.

The return line 7 is not only connected with the control outlet B′ of the logistor 1″ but also is connected with the control unit 2′ and the control unit 2″ with the return connections being designated by reference character R and only illustrated schematically. The return connection between the return line 7 and the control units 2′, 2″ correspond to the arrangement illustrated in FIG. 1, that is, a connection is established by virtue of the positioning of the spherical control elements 4′ or 4″ between the respective control inlets X and return line 7.

The control system of FIG. 2 operates in the following manner:

If the controller 23 determines, due to the transmission of a governing variable and a measuring variable, that the valve member 14 of the exhaust gas control valve 11 is to be opened, or open to a greater extent, then a control signal is applied to the control unit 2′ which may, for example, be a pilot valve, whereby a communication is established between the control inlet X and return line 7 and, accordingly, a signal is transmitted from the controlled control outlet B of the logistor 1′. The repeated transmission of signals from the controlled control outlet B, which signals are fed to the inlet 21 of the operating cylinder 12, effects an increase of the pressure in the chamber 16 of the operating cylinder 12 since, at the same time, the control unit 2″ does not receive any signal from the controller 23 and, consequently, the logistor 1″ does not transmit an output signal at the controlled control outlet B′, whereby the connection between the inlet A′ and the outlet B′ of the logistor 1″ remains closed. Thus, no pressure reduction takes place at the outlet 22 of the cylinder 12. The pressure increase in the chamber 16 causes the working piston 13 to be raised.

A lowering of the working piston 13 may be accomplished by feeding a signal from the controller 23 to the control unit 2″ while at the same time not transmitting a signal to the control unit 2′ so that the connection between the inlet A′ and the outlet B′ of the logistor 1″ is temporarily opened while the connection between the inlet A and the controlled control outlet B of the logistor 1′ remains blocked. Due to this fact, a pressure reduction is possible in the chamber 16 of the operating cylinder 12 through the outlet 22, the logistor 1″, and the return lines 7, causing a lowering of the working piston 13 which is under a bias of the spring 15. In lieu of a spring 15, it is also possible to provide some other biasing means or a pair of springs in the respectively required arrangement to that certain preferential positions of the piston 13 are obtained during a pressure failure, for the rest position, or the like.

Figure 3:
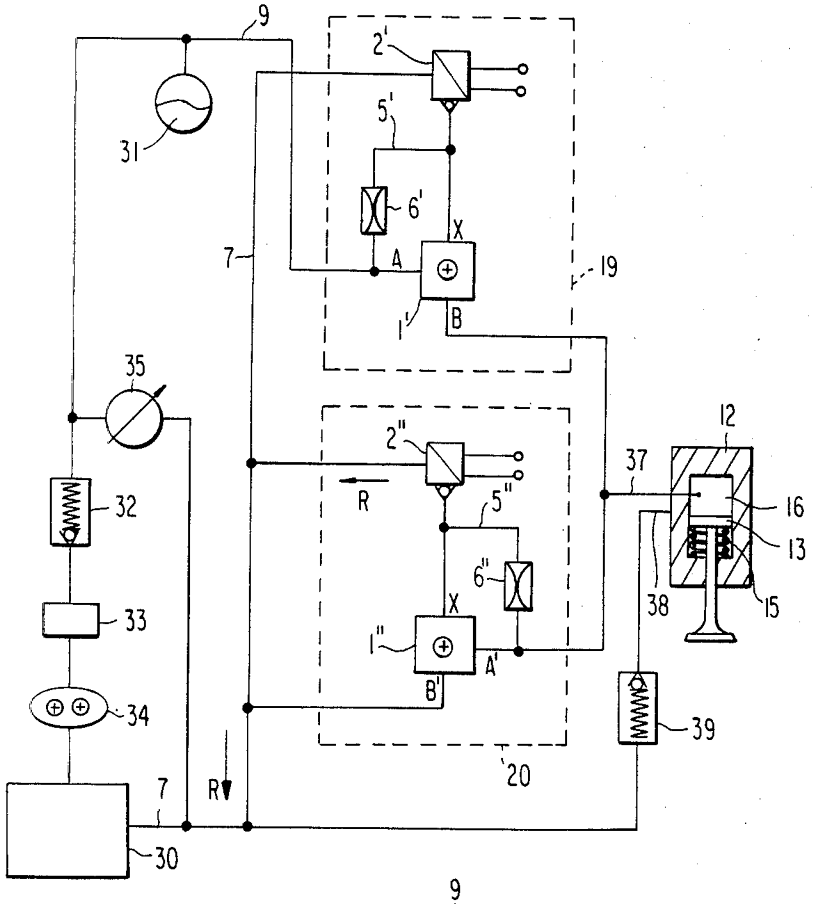
FIG. 3 is a schematic cross sectional view of a further embodiment of a control installation in accordance with the present invention or adjusting of a hydrogen-injector valve for internal combustion engines, with the control installation operating in a bistable fashion.

FIG. 3 provides a switching diagram of a control installation for controlling a hydrogen injector valve in an internal combustion engine. The control installation of FIG. 3 operates in a bistable fashion and is connected to a tank 30 through a hydraulic reservoir 31, a check valve 32, a filter 33, and a high-pressure pump 34 which serves as a pressure source. A pressure regulator 35 is disposed between the return line 7 leading to the tank 30 and the check valve 32. A conduit leading away from the check valve 32 and extending to the hydraulic reservoir 31 represents a feed line which, as shown in FIG. 3, is connected to the pressure inlet A of the first logistor 1′. While, in the construction of FIG. 2, the servo member was illustrated as an operating cylinder 12 having separate inlet and outlet ports, as shown in FIG. 3, a servo member 12′ is provided which has a single connection 37 connected to the controlled control outlet B of the logistor 1′ as well as to the pressure inlet A′ of the second logistor 1″. The servo member 12′ may, for example, be in mechanical connection with a valve member of a hydrogen-injector valve of an internal combustion engine. A further connection 38 of the servo member 12′ is connected through a pressure relief valve 39 to the return line 7.

As in the construction of FIG. 2, the outlet B′ of the second logistor 1″, as well as each control unit 2′, 2″, are connected to the return line 7. The control units 2′, 2″ may be connected, analogously to the control arrangement of FIG. 2, to a controller for receiving control signals representing a governing variable and/or a measuring variable. The bypass lines 5′, 5″ are provided between each control inlet X and the pressure inlets A, A′ of the logistors 1′, 1″, corresponding to the arrangement described hereinabove in connection with FIG. 1.

The arrangement of FIG. 3 operates in the following manner:

When the first logistor 1′ is actuated by a control signal fed to the control unit 2′, the connection of the inlet A and the controlled outlet B of the logistor 1′ is open during the activation of the control unit 2′ so that the pressure applied to the feed line 9 is passed onto the servo member 12. If no control signal is simultaneously applied to the control unit 2″, the connection between the inlet A′ and the control outlet B′ of the logistor 1″ remains closed, and a pressure build-up is possible in the chamber 16 of the control member 12′, whereby the control member 12′ may be operated. If no signal is applied to the control unit 2′, the connection between the inlet A and the control outlet B of the logistor 1′ remains closed and, if in this condition, a signal is applied to the control unit 2″, the connection is open between the inlet A′ and the control outlet B′ of the logistor 1″ whereby the pressure of the control member 12′, which pressure is built up in the chamber 16, may be reduced by establishing the connection, through the logistor 1″, to the return line 7. Thereby, an operation of the control member 12′ is made possible but with an opposite effect as compared with the step of feeding a control signal to the control unit 2′.

Figure 4:
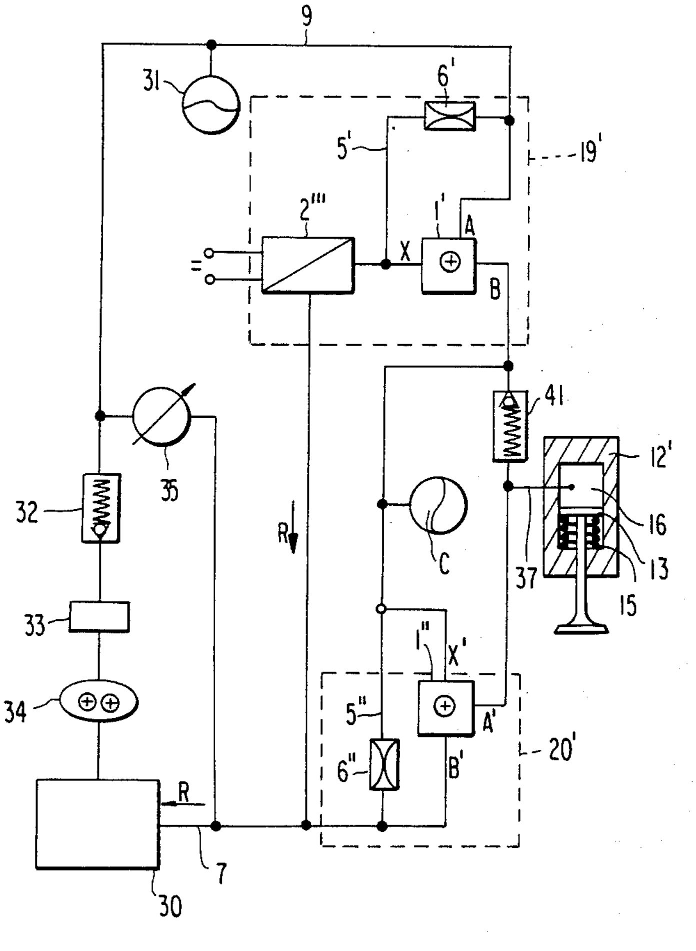
FIG. 4 is a schematic view of a control installation corresponding to FIG. 3, wherein the installation operates in a monostable fashion.

FIG. 4 provides an example of a control installation similar to the arrangement of FIG. 3; however, the control installation of FIG. 4 operates in a monostable mode as contrasted to the bistable mode of the operation of the control system of FIG. 3 Thus, the elements identical with the control arrangement of FIG. 3 will not be explained in greater detail. The first logistor 1′ of the control installation of FIG. 4 has the same structure as described in connection with FIG. 1 and also in conjunction with FIG. 3. In contrast to the arrangement of FIG. 3, the control installation of FIG. 4 only has a single control unit 2‴ with a control outlet B of the logistor 1′ being connected, on the one hand, directly to the control inlet X′ of the second logistor 1″ and also, through a check valve 41, to the connection 37 of the servo member 12′ for controlling an operation or positioning of a hydrogen injector valve. Moreover, the inlet A′ of the logistor 1″ is connected to the connection 37, the control outlet B′ of the logistor 1″ is in direct connection with the return line 7. A throttling means 6″ is disposed between the control inlet X′ and the control outlet B′ of the second logistor 1″. A reservoir C is connected to the control line 5″. The throttle means 6″ and reservoir C are adapted so that they function as a timing member analogously along the lines of an RC member of an electrical circuit. The time synchronization takes place according to the shortest setting or opening time required for the servo element 12′ or piston 13 of such servo element.

The control installation of FIG. 4 operates in the following manner:

If a control signal is applied to the control unit 2″, the connection between the inlet A and outlet B of the logistor 1′ is opened up so that thereby a pressure present at the line 9 is conducted through the check valve 41 and the connection 37 into the chamber 16. As long as a signal is transmitted from the outlet B of the logistor 1′, the second logistor 1″, due to its connection with the throttling means 6″, does not yield a signal at its outlet B′, that is, the connection between the inlet A′ and outlet B′ of the logistor 1″ remains closed so that a pressure increase is obtained in the chamber 16. However, if no control signal is applied to the control unit 2‴, then the connection between the inlet A and outlet B of the first logistor 1′ remains closed. The previously filled reservoir C discharges its stored content through the conduit 5″ and through the throttling means 6″ into the return line 7. Consequently, when the engine is turned off, the connection from the junction 37 through the logistor 1″ and return lines 7 to the tank 30 remains open and thus the servo member 12′ allows the valve coupled therewith to close. The same function occurs also in the control arrangement of FIG. 2 wherein, when the engine is turned off, the exhaust gas control valve 11 is closed, this being based upon the special constructional principle of the logistor.

By means of the control installations described hereinabove in connection with FIGS. 2–4, a control of the operating members is possible with a minimum of electrical energy since the control units, for example, constructed as pilot valves, only exercise a control function. The energy for operating the respective servo members 12, 12′ is obtained either from the engine oil circulatory system or by the conveying pressure of the fuel system associated with the engine and no energy is required for control at static operation.

In the control installations described hereinabove, basically two control blocks 19, 20 or 19′, 20′ are utilized in all cases wherein each control block includes a logistor, a control unit, and a bypass line with a throttling means. However, in the control installation of FIG. 4, the second control block 20′ contains a logistor 1″, the inlet X′ of which is in a feedback relationship with the control outlet B through the throttling means 6″; whereas, the outlet A is connected to the junction 37. In the arrangement of FIG. 4, it is significant to note that the control block 20′ does not contain its own control unit 2‴. In each of the above described control installations, the servo members 12 or 12′ have, in each case, only a single pressure chamber 16 in communication with the associated inlets or outlets of the logistors of the control blocks 19, 20.

Figure 5:
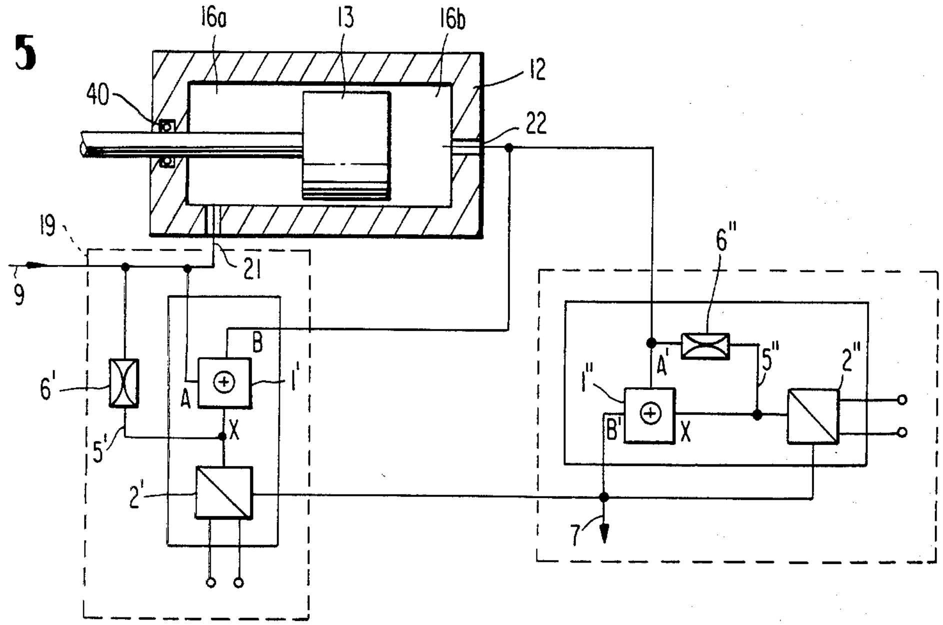
FIG. 5 is a schematic cross sectional view of yet another embodiment of a control installation in accordance with the present invention.

FIG. 5 provides an example of a control installation utilizing a cylinder-piston unit having two pressure chambers. More particularly, as shown in FIG. 5, a servo member 12″ is provided which includes two pressure chambers *16a, 16b*. The arrangement of the two pressure chambers *16a, 16b* corresponds to the provision of a stepped piston or a differential cylinder. An operating piston 13′ is arranged in the servo member 12″ so as to be displaceable with respect to a pressure space formed by the two chamber portions *16a, 16b*. The operating piston 13 includes a piston rod *13b* supported in a pressure tight manner in the servo member 12″ by way of a sealing gasket 40.

The pressure chamber *16a* is provided with an opening or aperture 21 which communicates with the inlet A of the logistor 1′ of the first control block 19. As with the control installations described hereinabove, a bypass line 5 with a throttling means 6′ is disposed between the inlet A and the control inlet X. The inlet A is in communication with the conduit 9 for supplying a pressure medium thereto. The control outlet B is connected to an opening or aperture 22 of the servo or operating member 12″, with the opening 22 providing the access or communication to the chamber *16b*.

The inlet A of the logistor 1″ of the second control block 20 is connected to the opening 22 with the control inlet X of the logistor 1″ of the second control block 20 being connected, through a bypass line 5″ and throttle means 6″, in a feedback coupling to the inlet A of the logistor 1″. The control outlet X of the logistor 1′ of the first control block 19 as well as the control inlet X of the logistor 1″ of the second control block 20 are connected to associated switching units 2′, 2″ as shown most clearly in FIG. 5. The control outlet B of the logistor 1″ of the second control block 20 is connected to the return line 7 and, as in the above-described control installations, the return line from the control units 2', 2'' is connected to the return line or conduit 7.

The control units 2', 2'' of the control installation of FIG. 5 may be of the type described hereinabove in connection with FIG. 1. Moreover, the control unit 2' of the control block 19 may be provided with a biasing device such as, for example, a spring, so as to ensure that the connection between the control inlet X and return line 7 is blocked when the control unit 2' is not activated. In contrast thereto, the control unit 2'' may be provided with a biasing means having an effect such that the connection between the return line 7 and the control outlet X in the block 20 is opened if the control unit 2'' has not been activated.

Suitable biasing devices for the control units 2', 2'' may, for example, take the form of compression springs or coil springs which, in a conventional manner, would be adapted to displace the spherical or ball-shaped control element 4 into the respective position during a currentless condition, that is, place the control unit 2' into a closed condition and the control unit 2'' into an open condition.

By virtue of the control installation of FIG. 5, it is possible to maintain the piston 13' in an infinitely variable manner between its extreme left hand and extreme right hand limit positions. The adjustment of the piston 13' takes place by producing correspondingly timed pressure differences between the respective pressure chamber 16*a*, 16*b*.

In situations wherein the working piston 13' is to assume a defined limit position with no control signals being applied to the control unit 2', it would be necessary to effect a modification. More particularly, instead of a logistor 1' closed in the embodiment according to FIG. 5, that is, there being no passage from inlet A to control outlet B as long as no control signal is applied to the control unit 2', a logistor 1' would be employed which is opened in this case so that the hydraulic fluid can flow from the inlet A to the logistor B and therefore into the chamber 16*b*. Consequently, the piston 13' would assume a left hand limit position in FIG. 5 is no control signal is transmitted to the two control units 2', 2'' over a predetermined time interval.

Figure 6A:
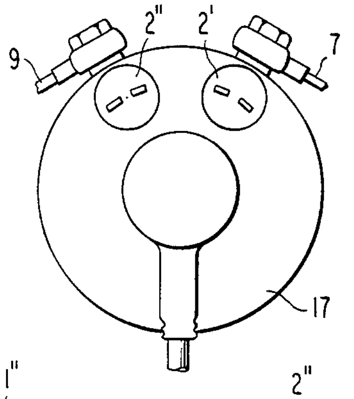
FIG. 6A is a top view of an embodiment of a control installation in accordance with the present invention constructed as a module.
Figure 6B:
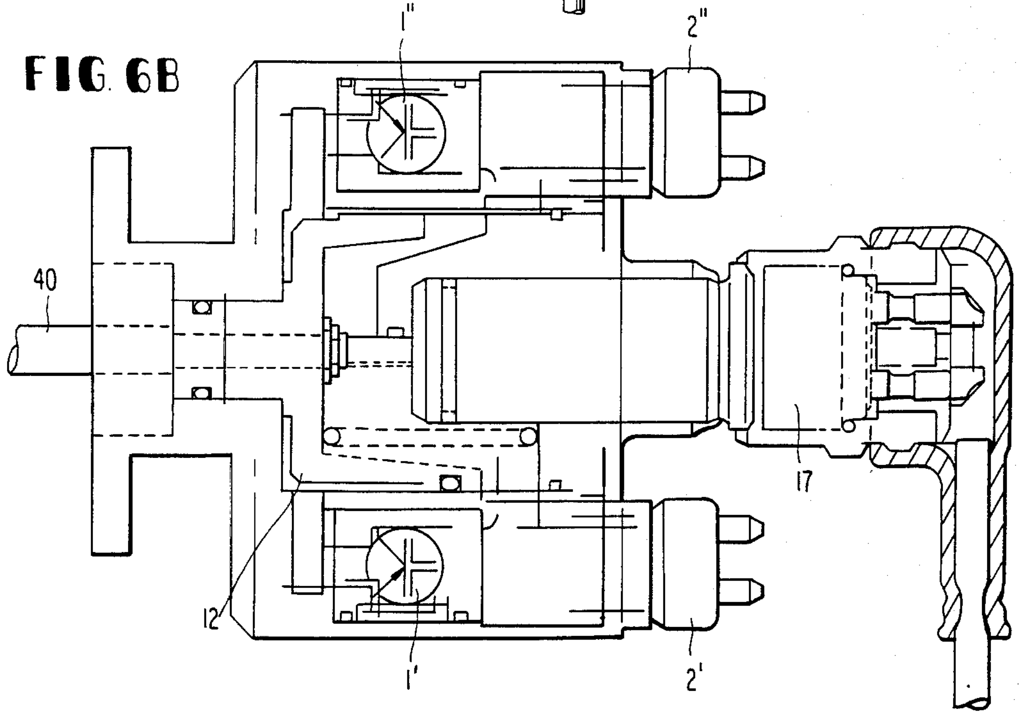
FIG. 6B is a schematic lateral view of the embodiment of the control installation of FIG. 6A.

FIGS. 6*a*, 6*b* provide an illustration of a control installation which is formed as a single module. More particularly, FIG. 6*a* provides a top view of a module containing the control installation of the present invention while FIG. 6*b* represents a schematic lateral view from which the individual elements of the control installation are more clearly recognizable. The module contains the measuring signal generator 17, optionally provided with the electronic controller 23 and amplifier circuit 24. The control units 2', 2'', the logistors 1', and 1'' with associated bypass line and throttling means as well as the working cylinders or servo members 12 are formed as integral components.

As shown most clearly in FIG. 6*b*, a valve member or an extension 36 of a valve member of a valve (not shown) extends from the left hand side of the module or component. The hydraulic connection lines for the return line 7 and feed line 9 are clearly illustrated in FIG. 6*a*. All of the elements contained in the module shown in FIGS. 6*a* and 6*b* may be arranged in an extremely space saving manner so that the module in total can be of a compact construction.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A pressure operated control installation, the installation comprising a pressure source means for supplying a pressure medium, at least one servo member comprising a control means for controlling a positioning of a control member, the control means including at least a first control block, the first control block including a first logistor means, a control unit, a first control element coupled to the control unit, and a first bypass line means provided with a first throttling means, the first logistor means comprising a first pressure conducting inlet means, first control inlet means and first control outlet means, the first bypass line connecting the first pressure conducting inlet means to the first control inlet means, the first control element adapted to control a communication between the pressure conducting inlet means of the first logistor means and the first control outlet means, the first control means further including a second control block comprising a second logistor means having a second pressure conducting inlet means, second control inlet means and second control outlet means, a second control element adapted to control a communication between the second pressure conducting inlet means of the second logistor means and the second control outlet means, and a second bypass line means provided with a second throttling means connected between the second control inlet means and second control outlet means, means for connecting the control outlet means of the first logistor means of the first control block means to a second control inlet means of the second control block means comprising means for effecting time delay by storing at least a portion of output from said control outlet means of the first logistor means and discharging at least a portion of said stored output in the absence of a signal applied to the control unit, the control outlet means of the logistor means of the second control block means being connected to a return line means, the second bypass line means of the second logistor means of the second control block means forming a feedback coupling to the second control inlet means, for controlling the second logistor means, means for communicating the control outlet means of the first logistor of the first control block means to the pressure conducting inlet means of the second logistor means of the second control block means and to said servo member, and a check valve means disposed in said communicating means and connected to the second pressure conducting inlet for preventing transmission of pressure to the control outlet means of the first logistor means.

2. A control installation according to claim 1, wherein the return line means is connected to a return tank.

3. A control installation according to claim 2, wherein a pressure line means is provided for carrying fluid under pressure from the pressure source means to the pressure conducting inlet means of the logistor means of the first control block means, and a hydraulic reservoir means is interposed in the pressure line means between the pressure source means and the pressure conducting inlet means.

4. A control installation according to claim 1, wherein the valve member is an hydrogen regulating valve member of an internal combustion engine.

5. A pressure operated control installation, the installation comprising
- a pressure source means for supplying a pressure medium,
- at least one servo member
- a control means for controlling a positioning of a control member,
- the control means including
- at least a first control block, the first control block including
- a first logistor means, a control unit, a first control element coupled to the control unit, and a first bypass line means provided with a first throttling means,
- the first logistor means comprising a first pressure conduct means, a first control inlet means and a first control outlet means,
- the first bypass line connecting the first pressure conducting inlet means to the first control inlet means,
- the first control element adpated to control a communication between the first pressure conducting inlet means of the first logistor means and the first control outlet means,
- the control means further including
- a second control block consisting of a second logistor means having a second pressure conducting inlet means, second control inlet means and second control outlet means, a second control element adapted to control a communication between the second pressure conducting inlet means of the second logistor means and the second control outlet means, and a second bypass line means provided with a second throttling means connected between the second control inlet means and second control outlet means,
- means storing at least a portion of output from the control outlet means of the first logistor means for effecting a time delay in an input to the return line means by discharging at least a portion of said stored output in the absence of a signal applied to the control unit,
- the servo member includes a pressure chamber means having an adjustable working piston means disposed therein,
- a control outlet means of the second logistor means of the second control block means connected to the return line means,
- the second bypass line means of the second logistor means of the second control block means forms a feedback coupling for controlling the second logistor means, and
- means for connecting the control outlet means of the first logistor means of the first control block means and the pressure conducting inlet means of the second control block means to the pressure chamber means and comprising a check valve means preventing transmission of pressure to the control outlet means of the first logistor means.

6. A pressure operated control installation, the installation comprising
- a pressure source means for supplying a pressure medium,
- at least one servo member
- a control means for controlling a positioning of a control member,
- the control means including
- at least a first control block, the first control block including
- a first logistor means, a control unit, a first control element coupled to the control unit, and a first bypass lien means provided with a first throttling means,
- the first logistor means comprising a first pressure conducting inlet means, a first control inlet means and a first control outlet means,
- the first bypass line connecting the first pressure conducting inlet means to the first control inlet means,
- the first control element adapted to control a communication between the first pressure conducting inlet means of the first logistor means and the first control outlet means,
- the control means further including
- a second control block consisting of a second logistor means having a second pressure conducting inlet means, second control inlet means and second control outlet means, a second control element adapted to control a communication between the second pressure conducting inlet means of the second logistor means and the second control outlet means, and a second bypass line means provided with a second throttling means,
- means storing at least a portion of output from the control outlet means of the first logistor means for effecting a time delay in an input to the return line means by discharging at least a portion of said stored output in the absence of a signal applied to the control unit,
- the servo member includes a pressure chamber means having an adjustable working piston means disposed therein,
- a controller means connected to the control unit of the first logistor for controlling said control unit in dependence upon predetermined parameters,
- the control outlet means of the second logistor means of the second control block means is connected to a return line means,
- the second bypass line means of the second logistor means of the second control block means forms a feedback coupling for controlling the second logistor means,
- means for connecting the control outlet means of the first logistor means of the first control block means and the pressure conducting inlet means of the second control block means to the pressure chamber means and comprising a check valve means for preventing transmission of pressure to the control outlet of the first logistor means.

* * * * *